United States Patent [19]
Kain

[11] 3,883,180
[45] May 13, 1975

[54] WHEEL HUB CAP FOR SKATE WHEELS

[76] Inventor: Calvin L. Kain, 1325 Rockdale Rd., Bartlesville, Okla. 74003

[22] Filed: Oct. 1, 1973

[21] Appl. No.: 402,045

[52] U.S. Cl............ 301/5.3; 301/108 A; 301/108 R
[51] Int. Cl............................................... B60b 7/06
[58] Field of Search .... 301/5.3, 5.7, 108 S, 108 SC, 301/108 R, 37 P, 37 R

[56] References Cited
UNITED STATES PATENTS

| | | | |
|---|---|---|---|
| 2,151,485 | 3/1939 | Pawsat .......................... | 301/108 SC |
| 2,580,489 | 1/1952 | Wagner.................................. | 301/5.7 |
| 2,606,791 | 8/1952 | Specht ............................ | 301/108 R |
| 2,610,897 | 9/1952 | Rebmann.............................. | 301/5.7 |
| 2,612,410 | 9/1952 | Deschenes .......................... | 301/5.7 |
| 2,837,376 | 6/1958 | Bruno .............................. | 301/37 R |
| 3,726,566 | 4/1973 | Beith................................ | 301/63 R |

FOREIGN PATENTS OR APPLICATIONS

959,494   6/1964   United Kingdom.................. 301/5.7

Primary Examiner—M. Henson Wood, Jr.
Assistant Examiner—Reinhard J. Eisenzopf

[57] ABSTRACT

A wheel hub cap for skate wheels which is attachable to the outside of each roller skate wheel to provide a decorative cover for the axle and bearing members therein. The wheel hub cap is also provided with a means for preventing a loose axle nut from coming off or in the alternative to provide a warning for the skater when the axle nut becomes excessively loose.

4 Claims, 3 Drawing Figures

WHEEL HUB CAP FOR SKATE WHEELS

BACKGROUND OF THE INVENTION

1. Field of the Invention

The present invention relates to a skate wheel accessory and more particularly but not by way of limitation to a decorative hub cap for roller skate wheels which also serves to prevent or warn the skater of a loose wheel axle nut.

2. Description of the Prior Art

The typical roller skate wheel in present use comprises a wheel body made from some suitable rubber compound and is fitted with precision aligned bearing races. The wheel with bearing races is journalled on a threaded axle member equipped with outer races which are held in place by an axle nut. This axle nut often becomes loose and will completely back off the axle allowing the wheel to loosen which is a major cause of accidents to the skater and loss of the precision bearings carried thereby. Many different types of nuts such as the aircraft type locking nut have been tried but none have been found that provides foolproof locking.

Further, the outer portion of the ordinary skate wheel is provided with a rather large recess for housing the outer end of the axle to the nut attached thereto which is extremely difficult to produce in an attractive manner. The exposed threaded axle nut and bearing members are rather unsightly and serve to detract from the overall appearance of the skate and skate wheels.

SUMMARY OF THE INVENTION

The present invention is particularly designed and constructed for providing a hub cap or partial wheel cover for roller skate wheels which is attractive in design and may be provided in psychodelic colors to increase the esthetic appearance of the overall skate wheel. The inside surface of the hub cap is provided with a means for sensing the loosening of an axle nut and some cases prevents the nut from completely backing off the axle. Cases wherein the nut continues back off the axle, said nut will come into contact with the hub cap nut retainer means and will cause the entire hub cap to snap off the wheel thereby warning the skater that the axle nut thereof is loose.

DESCRIPTION OF THE DRAWINGS

Other and further advantageous features of the present invention will hereinafter more fully appear in connection with the detailed description of the drawings in which.

DETAILED DESCRIPTION OF THE PREFERRED EMBODIMENT

Figure 1:
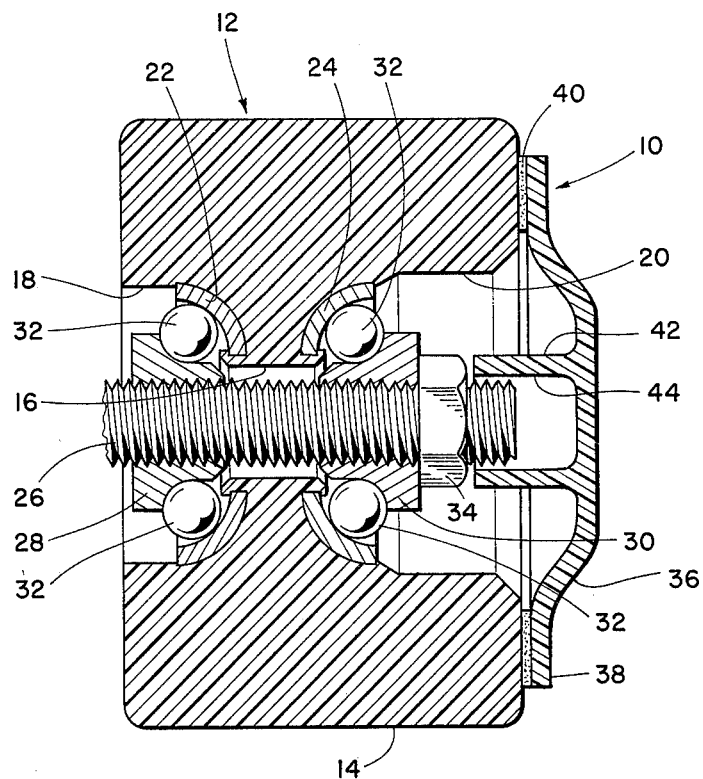
FIG. 1 is a sectional elevational view of a roller skate wheel having a wheel hub cap embodying the present invention stalled thereon.
Figures 2, 3:
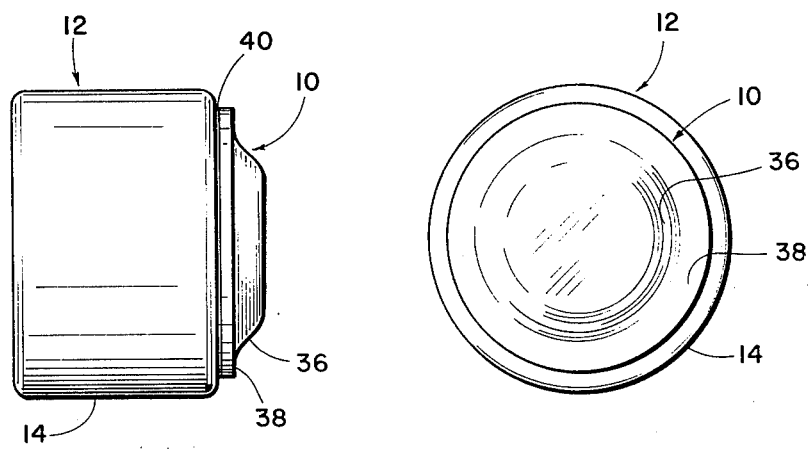
FIG. 2 is a front elevational view of a roller skate wheel having a hub cap attached thereto.
FIG. 3 is a side elevational view of the wheel and hub cap as depicted in FIG. 2.

Referring to the drawings in detail, reference character 10 generally indicates a wheel hub cap which is secured to the outside surface of a roller skate wheel generally indicated by reference character 12. The wheel 12 generally comprises a cylindrical wheel body 14 having a centrally disposed bore 16 therethrough. A pair of oppositely disposed recesses 18 and 20 are provided on each face of the skate wheel and in concentric alignment with the bore 16 therethrough. A pair of cup shaped bearing races 22 and 24 are secured within the recesses 18 and 20 respectively. An axle member 26 extends through the bore 16 and is centrally disposed with respect thereto. The axle member 26 is provided with a pair of oppositely disposed outer races 28 and 30 for supporting a plurality of bearings 32 between the said outer races 26 and 30 and the cup shaped inner races 22 and 24 respectively. The races hereinbefore described are held in place by a nut 34 which is threadably disposed on the outer end of the axle 26.

The wheel hub cap 10 generally comprises a circular dish shaped section 36 having an outwardly extending annular shaped attachment flange 38 therearound to form a substantially concave hub cap for attaching directly to the outside surface of the skate wheel body 14. The outer diameter of the attachment flange 38 should be sufficiently large to completely cover the recess 20 in the skate wheel body 14. The flange member 38 is attached to the wheel body 14 by means of an annular shaped tape member 40 having adhesive on both sides thereof.

A cylindrical sleeve member 42 having bore 44 therethrough is secured at one end thereof to the inside or concave face of the dish shaped portion 36 of the hub cap 10. The opposite end of the sleeve member 42 extends inwardly to a point adjacent to but not touching the outside surface of the wheel axle nut 34. The outer end of the axle 26 extends within the bore 44 of the sleeve 42 but without being in touching engagement therewith.

It is readily apparent from the foregoing description that the outer surface and configuration of the hub 10 may be of substantially any design and is not limited to the disk shaped hub cap hereinbefore described.

In operation, after the skate wheel 12 has been attached to the axle 26 and the race is secured in place by the nut 34, the skate wheel hub cap 10 is ready to secure into place. The skate wheel hub cap 10 is then sized to fit the particular skate wheel by trimming the inner end of the sleeve member 42 thereof so that the end thereof extends adjacent to but without touching the outer end of the nut 34. The adhesive disc 40 is then utilized to centrally secure the attachment flagne 38 of the hub cap 10 into place as depicted in FIG. 1. Care should be taken in the attachments of the hub cap 10 to the wheel body 14 to insure that it is centrally disposed on the wheel body so as to maintain the balance of the skate wheel and also to prevent the wheel axle 26 from touching the inside surface of the sleeve member 42.

If, during the skating operation, the nut 34 loosens around the axle 26 and starts to back off, the said nut 34 will contact the inner end of sleeve member 42. If the wheel and attached hub cap 10 is rotating in one direction the contact of the nut 34 with the sleeve 42 will tend to spin the nut back into place thereby not allowing it to loosen. If, on the other hand, the wheel 14 with attached hub cap 10 is rotating in the opposite rotation touching thereof will not prevent the nut from backing off. However, the hub cap 10 will be made from or coated with silicon type material which will offer very little frictional resistance when contacted by the nut itself.

If the nut continues to back off it will force the sleeve member 42 outwardly therefrom and before the nut is able to completely back off the axle 26 it will force the hub cap 10 completely loose from the skate wheel thereby warning the skater that he has a loose axle nut. After replacing and tightening the axle nut around the axle 26, the hub cap 10 may be reinstalled on the skate wheel for further service.

From the foregoing it is apparent that the present invention provides a decorative hub cap cover for a skate wheel and is provided with means for either preventing or warning the skater of a loose wheel axle nut.

Whereas, the present invention has been described in particular relation to the drawings attached hereto, it is obvious that other and further modifications apart from those shown or suggested herein may be made within the spirit and scope of this invention.

What is claimed:

1. In combination with a skate wheel rotatably secured to an exposed wheel axle and axle nut threadedly disposed thereon, a wheel hub cap comprising a substantially dish shaped body having an annular surface provided around the outer periphery of the concave face thereof, means provided on said annular surface for removably securing the hub cap body to the exposed face of the skate wheel, said means for removably securing the hub cap body to the exposed face of the skate wheel comprising a pressure sensitive adhesive.

2. In combination with a skate wheel rotatably secured to a wheel axle an axle nut threadedly disposed thereon, a wheel hub cap comprising a substantially dish shaped body having an annular surface provided around the outer periphery of the concave face thereof, means provided on said annular surface for removably securing the hub cap body to the exposed face of the skate wheel and including a centrally disposed sleeve extending inwardly from the concave face of the hub cap body for receiving the outer end of the wheel axle into the interior thereof, the interior diameter of said sleeve being smaller than the exterior size of the wheel nut.

3. A wheel hub cap for skate wheels as set forth in claim 2 wherein said sleeve terminates at its outer end at a point adjacent to the skate wheel axle nut.

4. A wheel hub cap as set forth in claim 2 wherein a means for removably securing the hub cap body to the exposed face of the skate wheel comprises a pressure sensitive adhesive.

* * * * *